United States Patent
Hayashi

(10) Patent No.: US 10,805,552 B2
(45) Date of Patent: Oct. 13, 2020

(54) VISUAL INSPECTION DEVICE AND ILLUMINATION CONDITION SETTING METHOD OF VISUAL INSPECTION DEVICE

(71) Applicant: OMRON Corporation, Kyoto (JP)

(72) Inventor: Shingo Hayashi, Otsu (JP)

(73) Assignee: OMRON Corporation, Kyoto (JP)

( * ) Notice: Subject to any disclaimer, the term of this patent is extended or adjusted under 35 U.S.C. 154(b) by 91 days.

(21) Appl. No.: 16/219,950

(22) Filed: Dec. 14, 2018

(65) Prior Publication Data

US 2019/0268522 A1 Aug. 29, 2019

(30) Foreign Application Priority Data

Feb. 23, 2018 (JP) .................. 2018-031111

(51) Int. Cl.
*H04N 5/235* (2006.01)
*G06T 7/00* (2017.01)
*G01N 21/88* (2006.01)

(52) U.S. Cl.
CPC ....... *H04N 5/2354* (2013.01); *G01N 21/8806* (2013.01); *G06T 7/0004* (2013.01);
(Continued)

(58) Field of Classification Search
CPC .. H04N 5/12354; H04N 5/235; G06T 7/0004; G01N 21/956; G01N 21/8806
See application file for complete search history.

(56) References Cited

U.S. PATENT DOCUMENTS 7,505,149 B2 * 3/2009 Ishiba .............. G01N 21/95684
356/237.1
7,970,200 B2 * 6/2011 Oguni ................... G06T 7/0004
382/145
(Continued)

FOREIGN PATENT DOCUMENTS

CN 103163741 6/2013
EP 1710566 10/2006
(Continued)

OTHER PUBLICATIONS

Lightning in Inspection; Witkowski; 2017. (Year: 2017).*
(Continued)

*Primary Examiner* — Luis Perez-Fuentes
(74) *Attorney, Agent, or Firm* — JCIPRNET

(57) ABSTRACT

A visual inspection device and a method for setting illumination condition thereof are provided to include an illumination part irradiating illumination lights to an inspection object; an imaging part capturing an image of the inspection object; a defect detecting part analyzing the image of the inspection object captured by the imaging part and detecting a defect of the inspection object; an illumination condition setting part setting an illumination condition of the illumination lights irradiated to the inspection object; and an optimum illumination condition deriving part deriving an optimum illumination condition by scoring each of the illumination conditions based on the images captured under plural and different illumination conditions, where the optimum illumination condition is the most suitable illumination condition for detecting the defect of the inspection object by the defect detecting part.

19 Claims, 7 Drawing Sheets

(52) U.S. Cl.
CPC ... *H04N 5/2351* (2013.01); *G01N 2021/8835* (2013.01); *G01N 2021/8845* (2013.01); *G06T 2207/30164* (2013.01)

(56) References Cited

U.S. PATENT DOCUMENTS

| | | | |
|---|---|---|---|
| 2003/0169418 A1* | 9/2003 | Fujii | G01N 21/95684 356/237.2 |
| 2005/0007593 A1 | 1/2005 | Lebens | |
| 2005/0281452 A1* | 12/2005 | Usikov | G06T 7/0004 382/141 |
| 2006/0257015 A1* | 11/2006 | Katahata | G06T 7/001 382/145 |
| 2010/0007896 A1* | 1/2010 | Fishbaine | G01N 21/8806 356/603 |
| 2010/0310150 A1* | 12/2010 | Hayashi | G06K 9/469 382/145 |
| 2013/0286396 A1* | 10/2013 | Matsumoto | G01N 21/251 356/402 |
| 2015/0338745 A1* | 11/2015 | Fukazawa | G03F 7/70625 355/77 |
| 2017/0358069 A1* | 12/2017 | Sagisaka | G06T 7/001 |
| 2017/0358070 A1* | 12/2017 | Sagisaka | G06T 7/001 |
| 2017/0358071 A1* | 12/2017 | Yamaoka | H04N 5/23293 |
| 2019/0268522 A1* | 8/2019 | Hayashi | G01N 21/8806 |

FOREIGN PATENT DOCUMENTS

| | | |
|---|---|---|
| JP | H11281334 | 10/1999 |
| JP | 2012517702 | 8/2012 |
| JP | 2014044150 | 3/2014 |
| JP | 2017156161 | 9/2017 |
| JP | 2018017638 | 2/2018 |
| TW | 200606445 | 2/2006 |
| TW | 201804151 | 2/2018 |

OTHER PUBLICATIONS

Reflected-episcopic light illumination; Nikon; 2020. (Year: 2020).*
NPL Google search; 2020. (Year: 2020).*
"Search Report of Europe Counterpart Application", dated May 20, 2019, p. 1-p. 7.
"Office Action of Taiwan Counterpart Application," with English translation thereof, dated May 6, 2019, p. 1-p. 17.
"Office Action of Korea Counterpart Application," dated Feb. 29, 2020, with English translation thereof, p. 1-p. 11.

* cited by examiner

VISUAL INSPECTION DEVICE AND ILLUMINATION CONDITION SETTING METHOD OF VISUAL INSPECTION DEVICE

CROSS-REFERENCE TO RELATED APPLICATION

This application claims the priority of Japan patent application serial no. 2018-031111, filed on Feb. 23, 2018. The entirety of the above-mentioned patent application is hereby incorporated by reference herein and made a part of this specification.

BACKGROUND

Technical Field

The disclosure relates to a technology for implementing a visual inspection of a product.

Related Art

In the past, a visual inspection device is known for detecting defects such as scratches, dents or color abnormality of a product based on a photographed image of the product (determination of presence or absence of defects and identification of defect types are included). The inspection device generally performs a defect detection by the method of irradiating an inspection target (also referred to as a work piece or an inspection object hereinafter) with an illumination light, capturing an image of a reflected light and/or a transmitted light of the illumination light with a camera, and setting a threshold to detect an abnormality based on a feature amount of pixel values corresponding to the defects that appear in the captured image.

For example, in patent literature 1 (Japanese Patent Application Laid-Open No. 2018-017638), a visual inspection device is described which takes an image in which gloss unevenness of the inspection target is eliminated and appropriately detects the defects by adjusting a light amount and color of the illumination light irradiated to the inspection target from a plurality of directions.

Meanwhile, in order to capture an image by which the various defects described above can be appropriately detected, for example, it is necessary to appropriately set (adjust) an illumination condition corresponding to a work piece, and the illumination condition includes various elements such as a direction of illumination light, a light amount (intensity) of illumination light and a color (wavelength) of illumination light and a combination of their values.

However, corresponding optical knowledge (or sufficient experience) is necessary to set such an illumination condition, and there is a problem that an operator equipped with such skills is not always on the scene to operate the inspection device.

The disclosure is accomplished based on the above circumstances, and the purpose is to provide a technology by which an optimum illumination condition can be set for the visual inspection device even without sufficient optical knowledge or experience.

SUMMARY

In view of the above and in one aspect of the disclosure, a visual inspection device is provided to include an illumination part irradiating illumination lights to an inspection object; an imaging part, capturing an image of the inspection object; a defect detecting part analyzing the image of the inspection object captured by the imaging part and detecting a defect of the inspection object; an illumination condition setting part setting an illumination condition of the illumination lights irradiated to the inspection object; and an optimum illumination condition deriving part, deriving an optimum illumination condition by performing a scoring on (or scoring) each of the illumination conditions based on the images captured under different illumination conditions, wherein the optimum illumination condition is a most suitable illumination condition for detecting the defect of the inspection object by the defect detecting part.

In addition, in another aspect, a method is provided for setting an illumination condition of the visual inspection device that detects a defect in an inspection object based on an image obtained by irradiating illumination lights to the inspection object to image the inspection object. The method includes a first step for selecting a plurality of illumination conditions for search in which a value of a prescribed element is fixed from all the combinations of elements defining the illumination conditions; a second step for capturing images under the illumination conditions for search set by the first step; a third step for performing a scoring one each of the illumination conditions for search based on the images obtained in the second step; a fourth step for performing a comparison of the illumination conditions for search scored in the third step and acquiring a temporal optimum illumination condition; a fifth step for estimating a range in which the optimum illumination condition actually exists based on the assumed optimum illumination condition acquired in the fourth step, and further performing the scoring under the illumination condition that the fixed value of the prescribed element is released in the range to acquire an actual optimum illumination condition; and a sixth step for setting the actual optimum illumination condition acquired in the fifth step as the illumination condition of a visual inspection.

DESCRIPTION OF THE EMBODIMENTS

An example of embodiments of the disclosure is described below with reference to the drawings.

Application Example

Figure 1:
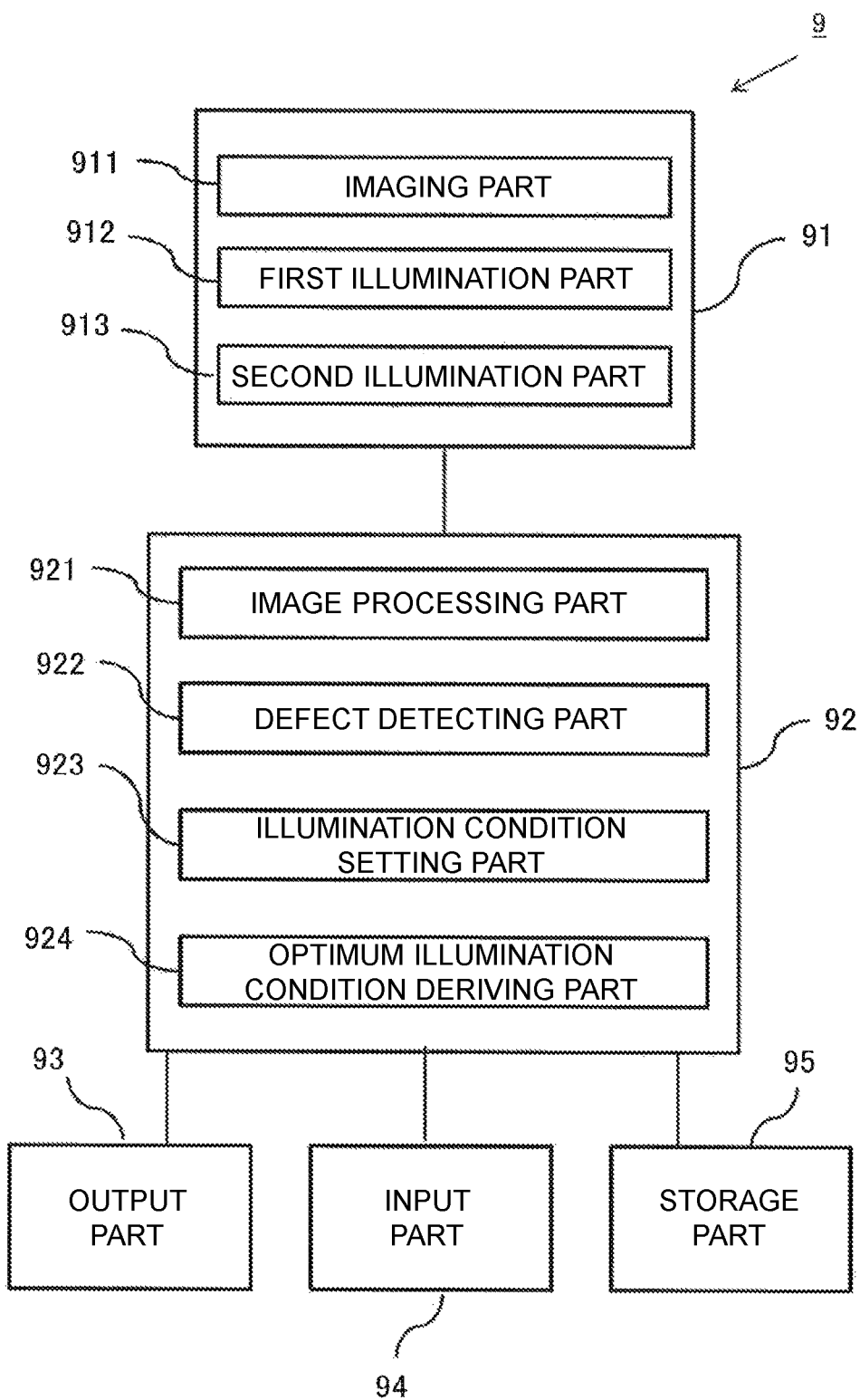
FIG. 1 is a block diagram schematically showing a visual inspection device of an application example.

FIG. 1 is a block diagram schematically showing a visual inspection device of the application example. As shown in FIG. 1, a visual inspection device 9 of the application example comprises an inspection device body 91, a control part 92, an output part 93, an input part 94, and a storage part 95, all of which are electrically connected. In addition, the inspection device body 91 comprises an imaging part 911 such as a color camera, a first illumination part 912, and a second illumination part 913.

The control part 92 is a CPU (processor) of a computer and includes an image processing part 921, a defect detection part 922, an illumination condition setting part 923, and an optimum illumination condition deriving part 924 as function modules. The output part 93 is used to output an interface screen, an inspection result, a captured image and the like and thus is typically formed by a display device. The input part 94 is used to input conditions or parameters necessary for an inspection and thus is formed by various input devices such as a keyboard, a mouse, a controller, a touch panel and so on. The storage part 95 is formed, for example, by a main storage device (memory), an auxiliary storage device hard disk and the like. The control part 92, the output part 93, the input part 94, and the storage part 95 may be formed integrally with the inspection device body 91, or may be formed as a separate general-purpose computer.

The image processing part 921 processes image data of a work piece captured by the imaging part 911 and generates an image for defect detection. In addition, the image data of the work piece captured by the imaging part 911 is stored in the storage part 95. The defect detection part 922 detects the defect of the work piece based on the image for defect detection generated by the image processing part 921. Specifically, determination of presence or absence of defects and identification of defect types of the work piece or the like are performed from a luminance value of each pixel constituting the image based on a threshold set in advance corresponding to a defect type.

The illumination condition setting part 923 controls the first illumination part 912 and the second illumination part 913 described later and performs the setting in a manner that the light irradiated to the work piece becomes a prescribed illumination condition. Here, the illumination condition refers to a condition defined by illumination elements such as the color (wavelength) and the intensity (luminance) of the irradiated light and a combination of values of these elements. The optimum illumination condition deriving part 924 derives the most suitable illumination condition corresponding to characteristics of the work piece in order to acquire (capture) an image suitable for detecting the defects based on a prescribed algorithm.

Figure 2:
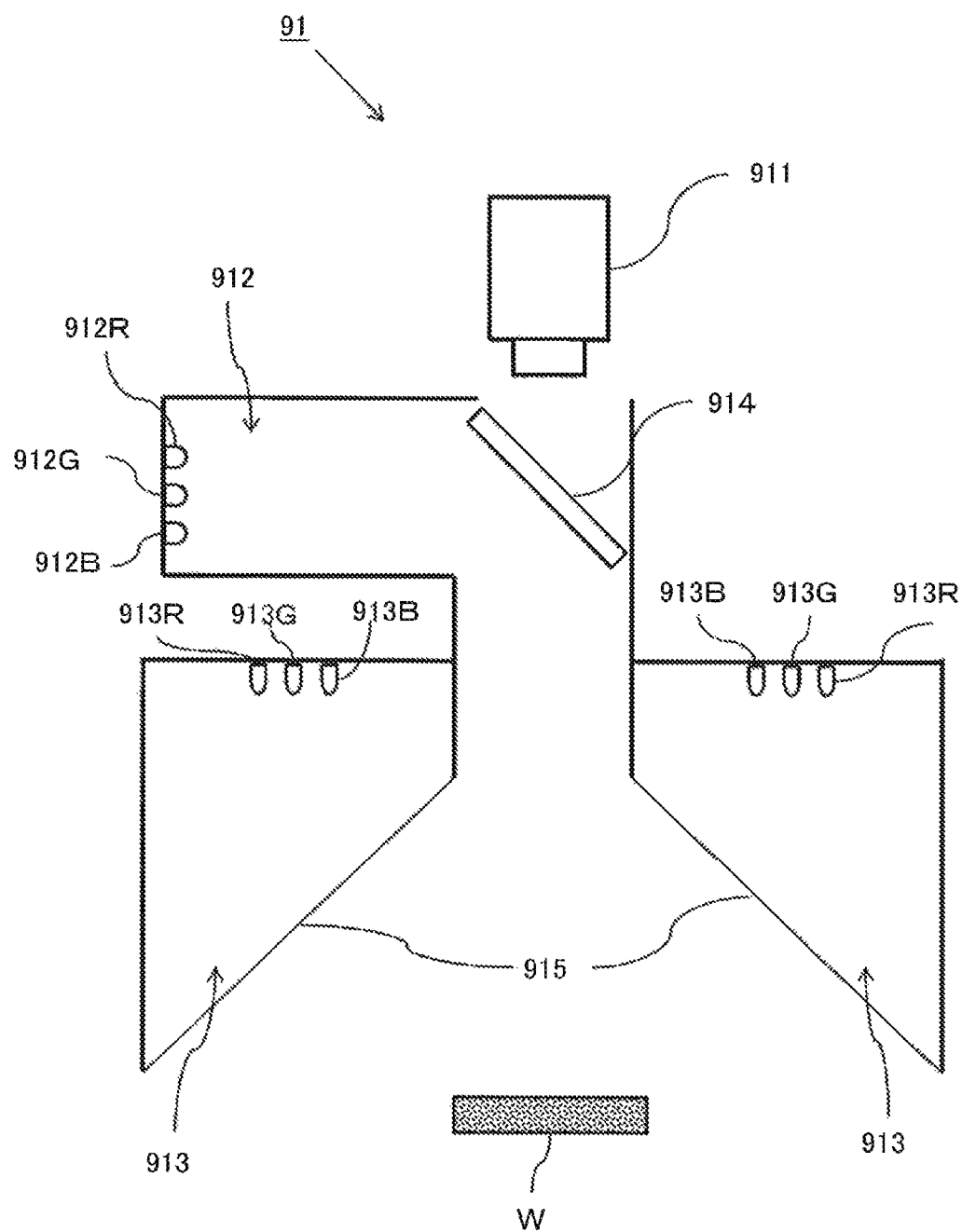
FIG. 2 is a drawing showing a schematic configuration of an inspection device body of the application example.

FIG. 2 is a drawing showing a schematic configuration of the inspection device body 91 of the application example. As shown in FIG. 2, the imaging part 911 of the application example is arranged above the work piece W so that an optical axis is directed toward a vertical direction. On the optical axis of the imaging part 911, a beam splitter 914 such as a half mirror and the like is arranged, and the first illumination part 912 for a coaxial episcopic illumination is disposed with respect to the beam splitter 914 in a direction perpendicular to the optical axis of the imaging part 911. The first illumination part 912 is formed, for example, by LED light sources 912R, 912G, 912B irradiating lights of R, G, B colors. The LED light sources 912R, 912G, 912B are arranged so that each optical axis thereof is directed toward the beam splitter 914, and lights irradiated from each light source are mixed and irradiated via the beam splitter 914 toward the work piece W.

The second illumination part 913 for an oblique incidence illumination is arranged below the beam splitter 914. The second illumination part 913 has a configuration in which a plurality of LED light sources 913R, 913G, 913B are arranged in a ring shape with the optical axis directed toward the vertical direction. In addition, a diffusion board 915 is disposed between the second illumination part 913 and the work piece W. Accordingly, lights of the R, G, B colors are mixed and irradiated via the diffusion board 915 toward the work piece W.

Next, a processing is described in which the optimum illumination condition deriving part 924 derives the optimum illumination condition corresponding to the work piece. The outline of the processing is to score the illumination condition that can be set (settable illumination condition) and set the illumination condition with the best score as the optimum illumination condition.

Here, as for the score of the illumination condition, for example, in regard to each image data captured with this illumination condition, an average luminance value of a region corresponding to the work piece on the image is subtracted from a pre-set target average luminance value, and a deviation of the luminance value of the region corresponding to the work piece is added to the obtained value to calculate the score of this illumination condition. That is, in the example, the closer of the average of the luminance value of the inspection region to the target average luminance value and the smaller the deviation is, the smaller the value that returns, and the illumination condition with the smallest score value is set as the optimum illumination condition.

Here, in regard to the first illumination part 912 and the second illumination part 913, when only ON and OFF of each light source of R, G, B can be switched, a total number of the illumination conditions (the elements constituting the illumination conditions and the combination of their values) is $2^6$ (2 gradations$^{(2\ directions \times 3\ colors\ (RGB))}$)=64. In this case, the work piece W may be captured in all the illumination conditions and the optimum illumination condition is derived by comparing the 64 scores.

On the other hand, in regard to each LED light source of the first illumination part 912 and the second illumination part 913, when the light amount (illumination intensity) can be adjusted, for example, at 256 gradations, the total number of the illumination conditions becomes enormous ($256^6$), and thus it is hardly realistic to image under all the illumination conditions and calculate the score.

Therefore, in this case, after performing a first search (also referred to as a sparse search hereinafter) that narrows all the illumination conditions that can be set down to a crowd of illumination condition groups which are estimated to include the combination of the optimum illumination condition, a second search (also referred to as a thorough search hereinafter), which searches the combination which is actually the optimum illumination condition from the narrowed down illumination condition groups, is performed to derive the optimum illumination condition.

In the sparse search, for example, for each LED light source of the first illumination part 912 and the second illumination part 913, an image is captured and the score is calculated under each of the illumination conditions that the illumination intensity is the same (that is, white illumination) and that are limited to 8 gradations. In this case, in regard to the 64 ($8^2$) illumination conditions, the score calculation may be performed. Then, the illumination condition with the smallest calculated score is set as a temporal optimum illumination condition.

Next, in the thorough search, in a range estimated to actually include the optimum illumination condition using the temporal optimum illumination condition calculated above as a reference, (imaging and) scoring are further performed in the illumination conditions without limitation on the illumination intensity. At this time, it takes a lot of time when the scoring is performed exhaustively under the illumination conditions in the above range, and thus the scoring is performed to the illumination conditions in the above range which are limited using a binary search for example, so as to actually obtain the optimum illumination condition.

In this way, the optimum illumination condition deriving part 924 derives the optimum illumination condition corresponding to the work piece, and thus the operator of the visual inspection device 9 can set the optimum illumination condition even without sufficient optical knowledge and experience.

In the following, an example of embodiments for implementing the disclosure is described in more detail. However, sizes, materials, shapes, relative configurations or the like of components described in the implementation example are not intended to limit the scope of the disclosure unless otherwise described.

Figure 3:
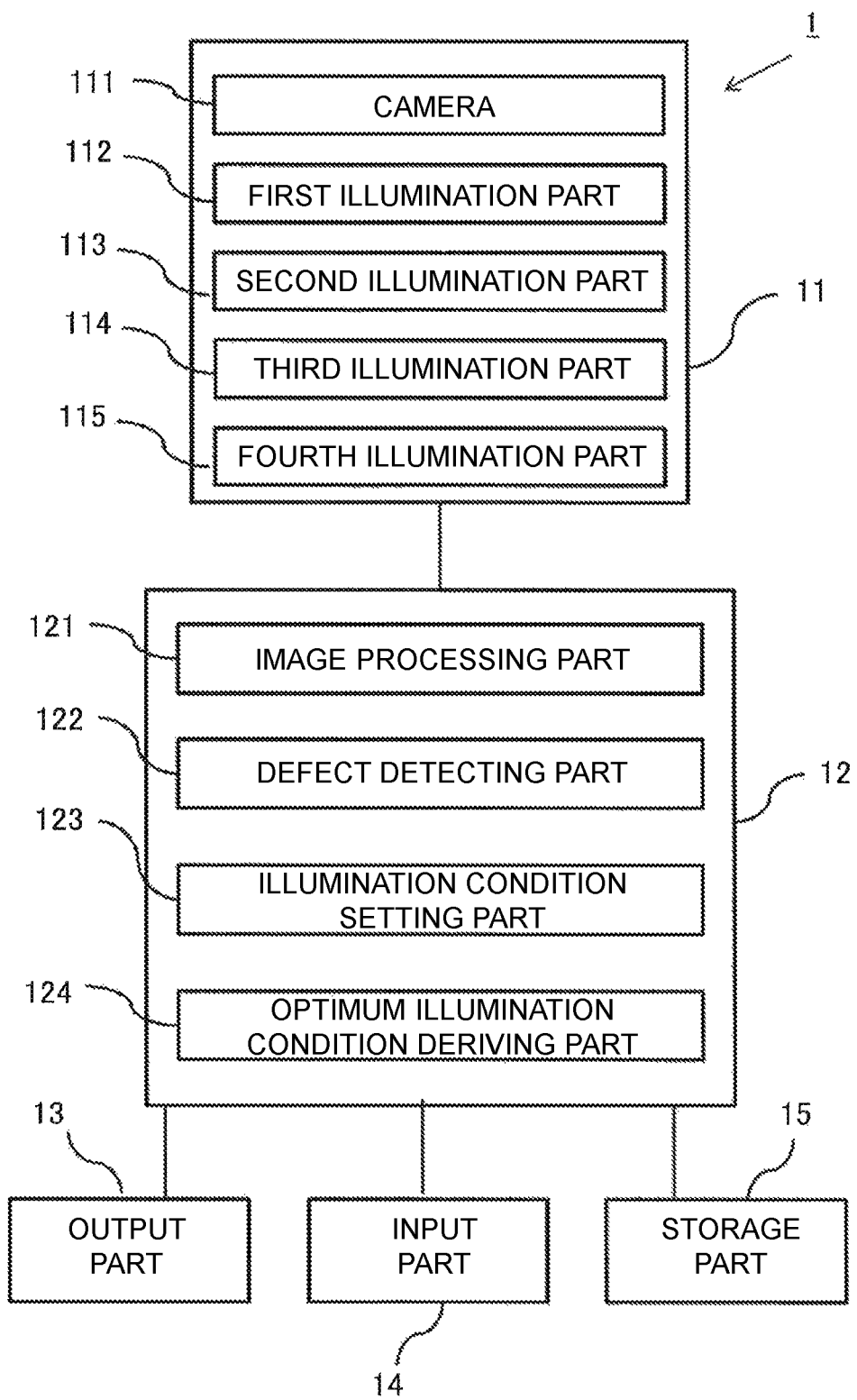
FIG. 3 is a block diagram schematically showing a visual inspection device of an implementation example.
Figure 4:
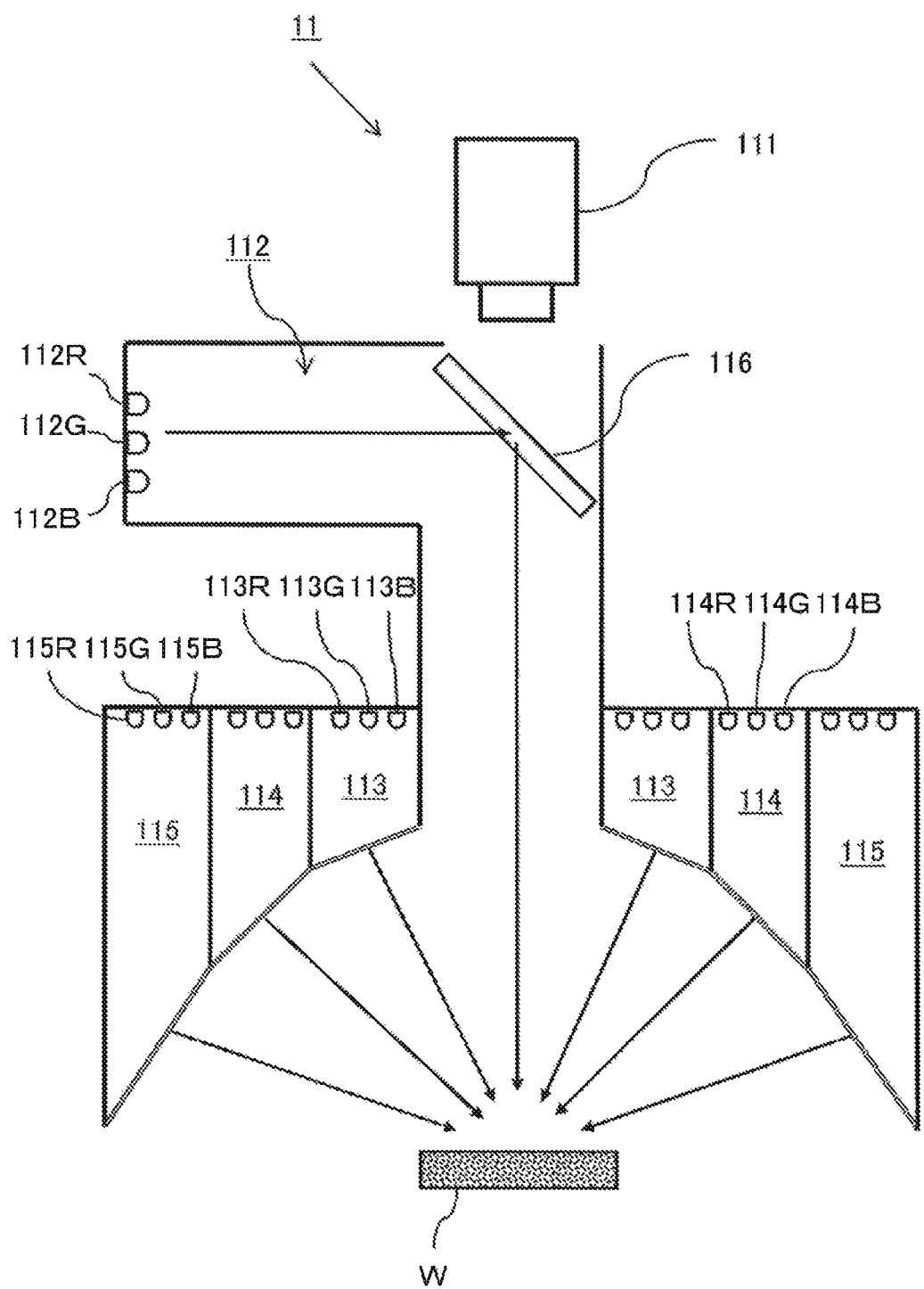
FIG. 4 is a drawing showing a schematic configuration of an optical portion of the inspection device body of the implementation example.

FIG. 3 is a block diagram schematically showing the visual inspection device 1 of the implementation example. In addition, FIG. 4 is a drawing showing a schematic configuration of an optical portion of an inspection device body 11 of the implementation example. As shown in FIG. 3, the visual inspection device 1 of the application example comprises an inspection device body 11, a control part 12, a display part 13, an input part 14, and a storage part 15, all of which are electrically connected.

The inspection device body 11 comprises a camera 111 as an observation optical system, and a first illumination part 112, a second illumination part 113, a third illumination part 114 and a fourth illumination part 115 as an illumination optical system. The camera 111 includes an imaging element in which n×m light-receiving elements are arranged in a matrix and is capable of capturing a color image. The light-receiving elements that detect the light output signals to the control part 12, and thereby the control part 12 acquires the image data. In addition, each light-receiving element of the imaging element corresponds to each pixel of the captured image. The camera 111 is disposed above the work piece W so that the optical axis is directed toward the vertical direction and an inspection position where the work piece W is placed is confined in the imaging area. Further, the work piece W may be an object having the gloss unevenness, or an object not having the gloss unevenness.

Each illumination part of the first illumination part 112, the second illumination part 113, the third illumination part 114, and the fourth illumination part 115 irradiates the illumination light to the work piece W placed in the inspection position. In each illumination part, as described later, the color or light amount of the illumination light irradiated to the inspection target is adjusted by the control of an illumination condition setting part 123. The optical system of the inspection device body 11 including the illumination parts is specifically described later.

The control part 12 is an operation processing device and includes an image processing part 121, a defect detection part 122, an illumination condition setting part 123, and an optimum illumination condition deriving part 124 as function modules. The display part 13 is, for example, a liquid crystal display device and outputs an interface screen, an inspection result, an acquired image and so on. The input part 14 is, for example, various input devices such as a keyboard, a mouse, a controller, a touch panel and the like, and is used to input conditions or parameters necessary for an inspection. The storage part 15 is, for example, a main storage device (memory), an auxiliary storage device hard disk and the like, in which a program for implementing each function module of the control part or various data such as the acquired image data and a threshold for defect detection are stored. The control part 12, the display part 13, the input part 14, and the storage part 15 may be formed integrally with the inspection device body 11, or may be formed as a separate general-purpose computer. Furthermore, the control part 12, the display part 13, the input part 14, and the storage part 15 may be connected to the inspection device body 11 by a wired or wireless communication element which is installed at a location away from the inspection device body 11.

The image processing part 121 is connected to the camera 111 and processes the image data of the work piece W captured by the camera 111 to generate an image for defect detection. Further, the image data of the work piece W captured by the camera 111 is stored in the storage part 15.

The defect detection part 122 detects defects of the work piece based on the image for defect detection generated by the image processing part 121. Specifically, determination of presence or absence of defect and identification of defect types of the work piece or the like are performed from the luminance value of each pixel constituting the image based on a threshold set in advance corresponding to the defect types and the like. Here, the defect detected by the defect detection part 122 is, for example, a color defect and an unevenness defect. The color defect is a defect which is generated due to an adhesion of foreign matter or dirt during the manufacturing process or after the manufacturing process of the work piece W, and the unevenness defect is a scratch or dent generated due to an imperfect molding during the manufacturing process of the work piece W or a collision with something after the manufacturing process. The visual inspection device 1 sets the work piece W in which no defect is detected by the defect detection part 122 as a non-defective product, and sets the work piece W in which the defect is detected by an image processing unit 4 as a defective product.

The illumination condition setting part 123 controls the first illumination part 112, the second illumination part 113, the third illumination part 114 and the fourth illumination part 115, and makes an adjustment (setting) in a manner that the light irradiated to the work piece becomes a prescribed illumination condition. Here, the illumination condition refers to a condition defined by illumination elements such as the direction, the color (wavelength) and the intensity (luminance) of the irradiated light, and a combination of values of these elements. The optimum illumination condition deriving part 124 derives the most suitable illumination condition corresponding to the characteristics of the work piece W in order to acquire (capture) an image suitable for the defect detection based on a prescribed algorithm.

Figure 5:
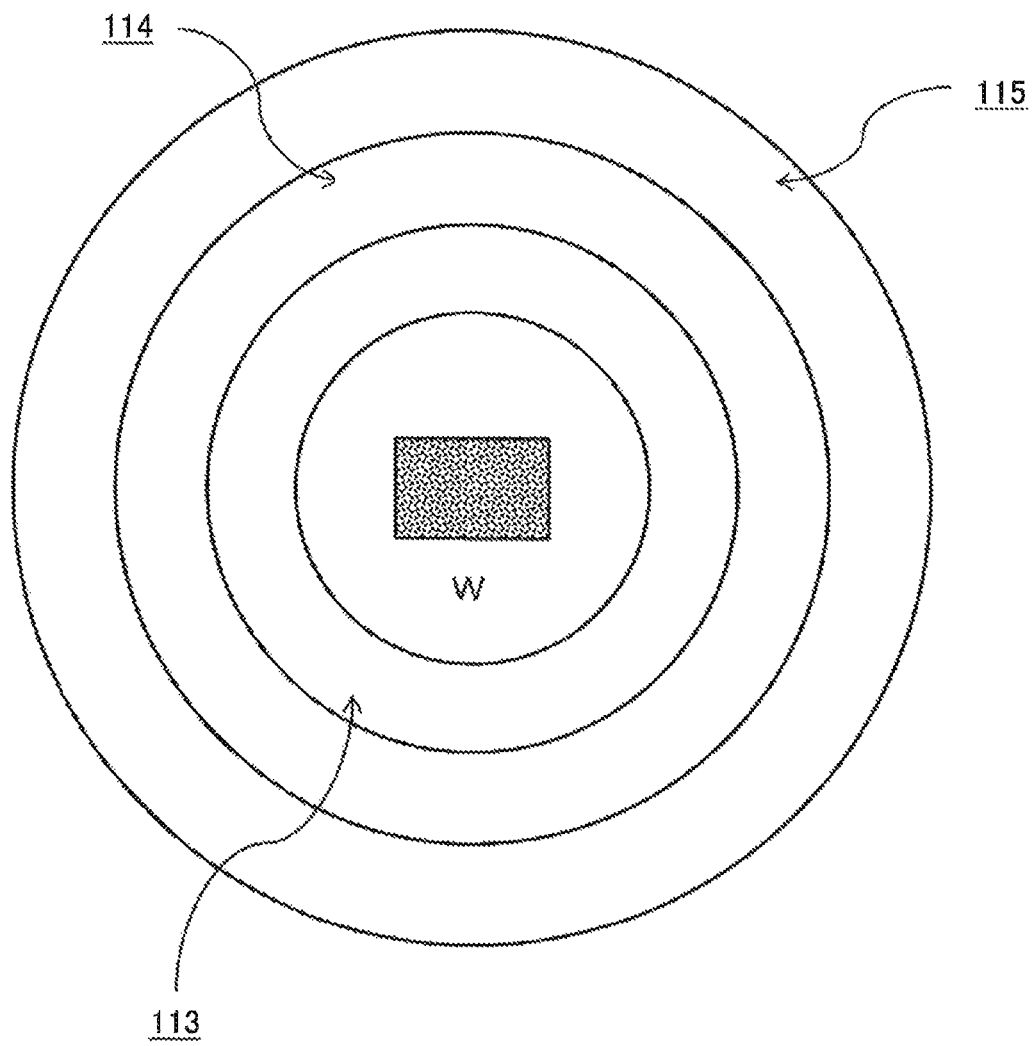
FIG. 5 is an explanation drawing of the optical portion of the inspection device body of the implementation example.

Next, based on FIG. 4 and FIG. 5, the optical system of the inspection device body 11 is described in detail. FIG. 4 is a cross-sectional view of the inspection device body 11 in an optical axis direction of the camera 111, and FIG. 5 is an explanation drawing showing a state of the second illumination part 113, the third illumination part 114, and the fourth illumination part 115 of the inspection device body 11 in a plan view. The inspection device body 11 has a dome-shaped portion covering the inspection position and includes a half mirror 116 disposed between the camera 111 and the inspection position. The camera 111 captures an image of the work piece W in the inspection position through the half mirror 116. In addition, the inspection device body 11 is provided with the first illumination part 112, the second illumination part 113, the third illumination part 114, and the fourth illumination part 115 which irradiate the illumination light to the work piece W.

The first illumination part 112 is arranged at substantially the same height as the half mirror 116. The height direction described here is the direction of the optical axis of the camera 111. The first illumination part 112 sets a red LED 112R emitting red light, a green LED 112G emitting green light, and a blue LED 112B emitting blue light as a set of light-emitting element group, and has more than one set of light-emitting element group. The red LED 112R, the green LED 112G, and the blue LED 112B are disposed so that light-emitting surfaces face to the half mirror 116. The light irradiated by lighting at least one of the red LED 112R, the green LED 112G, and the blue LED 112B is the illumination light of the first illumination part 112. The illumination light of the first illumination part 112 is irradiated, by the half mirror 116, from a direction in accordance with the optical axis of the camera 111 to the work piece W. That is, the illumination light of the first illumination part 112 is a coaxial episcopic illumination in which a regular reflection light reflected by the inspection target is irradiated in a light-receiving direction of each light-receiving element of the camera 111.

A light-emitting amount (and ON/OFF of the light-emission) of the red LED 112R, the green LED 112G, and the blue LED 112B are set by the control from the illumination condition setting part 123. Further, the light-emitting amount can be adjusted at 256 gradations.

As shown in FIG. 4 and FIG. 5, the second illumination part 113, the third illumination part 114, and the fourth illumination part 115 are ring-shaped spaces centered on the optical axis of the camera 111 in a plan view, and are arranged in this order from an inner peripheral side toward an outer peripheral side of a circle centered on the optical axis of the camera 111.

The second illumination part 113 sets a red LED 113R emitting red light, a green LED 113G emitting green light, and a blue LED 113B emitting blue light as a set of light-emitting element group, and has plural sets of light-emitting element groups. The second illumination part 113 has plural sets of light-emitting element groups disposed in a ring shape, and the red LED 113R, the green LED 113G, and the blue LED 113B are mounted so that the light-emitting surfaces are directed toward a lower side (an inspection position side).

In addition, on a lower end side of the second illumination part 113, a diffusion board is mounted by which the illumination light of the second illumination part 113 is inclined in an irradiation direction to the inspection position and is irradiated.

The light irradiated by lighting at least one of the red LED 113R, the green LED 113G, and the blue LED 113B is the illumination light of the second illumination part 113. A light-emitting amount (and ON/OFF of the light-emission) of the red LED 113R, the green LED 113G, and the blue LED 113B are set at 256 gradations by the control of the illumination condition setting part 123.

In addition, the third illumination part 114 and the fourth illumination part 115 have the same configuration as the second illumination part 113, and thus specific description is omitted.

In addition, the second illumination part 113, the third illumination part 114, and the fourth illumination part 115 are respectively separated by a light shielding plate, and the illumination lights of adjoining illumination parts are prevented from being incident to another illumination part.

The light which emits at least one color of the LEDs of various colors of the second illumination part 113, the third illumination part 114, and the fourth illumination part 115 is irradiated through the diffusion board to the work piece W. Here, in a case of lighting the LEDs of more than two colors, the lights are mixed on the LED side of the diffusion board, and then irradiated through the diffusion board to the work piece W. Further, inclination angles of the diffusion boards of the illumination parts relative to the optical axis of the camera 111 are different from each other, and thus illumination angles of the illumination lights irradiated by the second illumination part 113, the third illumination part 114, and the fourth illumination part 115 to the work piece W are different from each other.

For example, the illumination light resulted from lighting at least one of the red LED 113R, the green LED 113G, and the blue LED 113B of the second illumination part 113 is irradiated to the work piece W from a direction which forms an angle of about 20° with the optical axis of the camera 111. In addition, the illumination light resulted from lighting at least one of the red LED 114R, the green LED 114G, and the blue LED 114B of the third illumination part 114 is irradiated to the work piece W from a direction which forms an angle of about 37° with the optical axis of the camera 111. In addition, the illumination light resulted from lighting at least one of the red LED 115R, the green LED 115G, and the blue LED 115B of the fourth illumination part 115 is irradiated to the work piece W from a direction which forms an angle of about 60° with the optical axis of the camera 111. Moreover, in FIG. 4, solid arrows show irradiation directions of the illumination lights.

Next, a processing is described in which the optimum illumination condition deriving part 124 derives the optimum illumination condition corresponding to the work piece. The outline of the processing is to score the illumination condition that can be set (settable illumination condition) and set the illumination condition with the best score as the optimum illumination condition. The scoring is obtained based on the image data of the work piece captured under each illumination condition by the following formula (1) for example.

$$f(img_u) = \left| V_a - \frac{1}{n}\sum_{i=0}^{n}(x_i) \right| + \sqrt{\frac{1}{n}\sum_{i=0}^{n}(x_i - \bar{x})} \qquad (1)$$

In the above formula (1), "$V_a$" is a target average luminance value and an initial setting may be set to, for example, 127 (a middle value in a case of 256 gradations). In addition, "$x_i$" is the luminance of the i-th pixel (which is set as an average value of R, G, B). In addition, "x with a bar (overline)" is an average value and "n" is a total number of pixels in the inspection region (not always the entire work piece W). "img" is a set of images captured under the illumination conditions that can be set. "$img_u$" is the image captured under the illumination condition "u". "f(img)" is a score of the image "img" (the smaller the score is, the less the unevenness becomes and the closer to the target average luminance value).

In the aforementioned formula (1), the average luminance value of the inspection target region is subtracted from a pre-set target average luminance value, and a deviation of the luminance value of the region corresponding to the work piece is added to the obtained value to calculate the score. That is, in the example, the closer of the average of the luminance value of the inspection region to the target average luminance value and the smaller the deviation is, the smaller the value that returns, and the illumination condition with the smallest score value is set as the optimum illumination condition.

Here, the total number of the illumination conditions (the combinations of values of direction, color, intensity of the illumination light) in the implementation example is $256^{12}$ (256 gradations $^{(4\ directions \times 3\ colors\ (RGB))}$), and it is hardly realistic to image under all the illumination conditions and calculate the scores.

Therefore, actually, after performing the sparse search that narrows all the illumination conditions that can be set down to a crowd of illumination condition groups which are estimated to include the combination of the optimum illumination condition, a thorough search, which searches a combination that is actually the optimum illumination condition from the narrowed down illumination condition groups, is performed to derive the optimum illumination condition.

Figure 6:
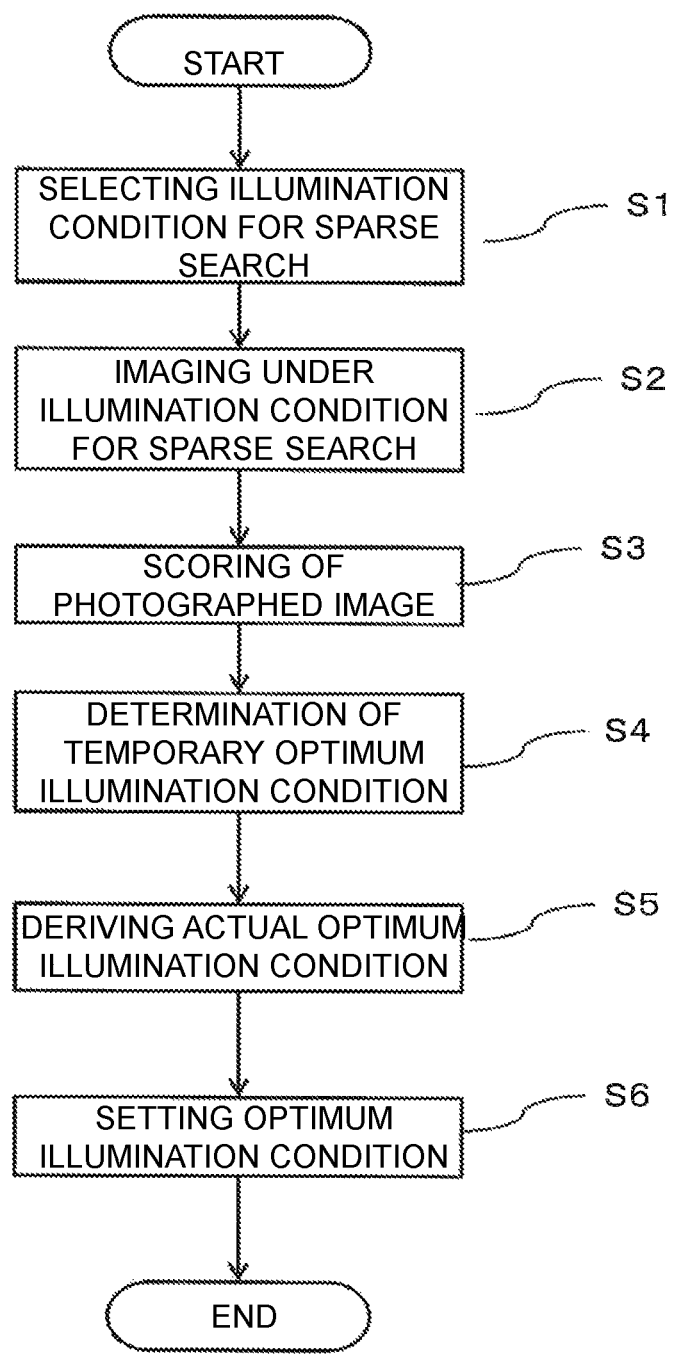
FIG. 6 is a flowchart showing a processing flow for performing a derivation of an optimum illumination condition in the visual inspection device of the implementation example.

Specifically, by the flow described below, the derivation of the optimum illumination condition is performed at a realistically acceptable time. FIG. 6 shows the flow of a processing in which the derivation of the optimum illumination condition is performed in the implementation example. As shown in FIG. 6, at first, the optimum illumination condition deriving part 124 selects, from all the illumination conditions that can be set, illumination conditions for sparse search in which the value of a prescribed element is fixed. For example, as for the illumination intensity of each LED light source, the illumination condition in which there are three gradations (for example, the illumination intensity of 0, 127, 255) and all the LED light sources are in the same illumination intensity (that is, colors of the illumination lights are white only) is selected (step S1).

After that, the combinations of target illumination conditions are 81 by using 3 gradations ($^{4\ directions \times 1\ color}$). Then, the image of the work piece W is captured under the illumination condition selected in this way (step S2), and the corresponding illumination condition is scored by the aforementioned formula (1) based on the obtained image data (step S3). Furthermore, a comparison of scores is performed on the 81 scored illumination conditions, and the illumination condition with the best score is set as the temporal optimum illumination condition (step S4). The steps up to this point correspond to the sparse search.

Then, a processing is performed in which the actual optimum illumination condition is acquired using the temporal optimum illumination condition acquired in step S4 as a reference. Specifically, a range in which the optimum illumination condition actually exists is estimated from the temporal optimum illumination condition, and (the imaging of the work piece and) the scoring is further performed under the illumination conditions without limitation on the illumination intensity in the above range. At this time, it takes a lot of time when the scoring is performed exhaustively under the illumination conditions in the above range, and thus the scoring is performed to the illumination conditions in the above range which are further limited using a binary search, and the optimum illumination condition is actually acquired (step S5). The step to this point corresponds to the thorough search.

Then, the optimum illumination condition derived in step S5 is set as the optimum illumination condition used in the visual inspection (step S6), and the processing is completed.

According to the configuration of the visual inspection device described above, the illumination conditions that the image of the work piece is actually captured can be narrowed down even if the combination number of elements defining the illumination conditions is large, and the operator can efficiently perform the setting of the optimum illumination condition even without sufficient optical knowledge and experience.

<Variation 1>

Furthermore, in the above implementation example, the setting of the optimum illumination condition is performed using a single work piece as the target, but the setting of the (leveled) optimum illumination condition using a plurality of work pieces as targets can also be performed. For example, strictly speaking, there may be differences in characteristics (shape and quality) in each product even for the same lot of products, so that the optimum illumination conditions for these inspections may also be different depending on the differences. In this case, when trying to set the optimum illumination condition corresponding to each product, the illumination condition might be set every time for each product.

At this point, the above problems can be solved by setting the illumination condition leveled in a prescribed deviation range (acceptable in the inspection) as the optimum illumination condition for the plurality of work pieces.

Specifically, the sparse search shown above is performed for the plurality of work pieces, and the scores at that time are saved in accordance with the plurality of work pieces. Then, the illumination condition with the smallest score in the plurality of work pieces is set as the optimum illumination condition. The optimum illumination condition is calculated by the following formula (2).

$$f(img_u) = \left| \sum_{v=0}^{w} f(img_{u,v}) \right| \quad (2)$$

In formula (2), "w" is the total number of the work pieces which are used as targets, "$img_{u,v}$" is the image of a work piece "v" captured in an illumination condition "u".

<Variation 2>

Figure 7:
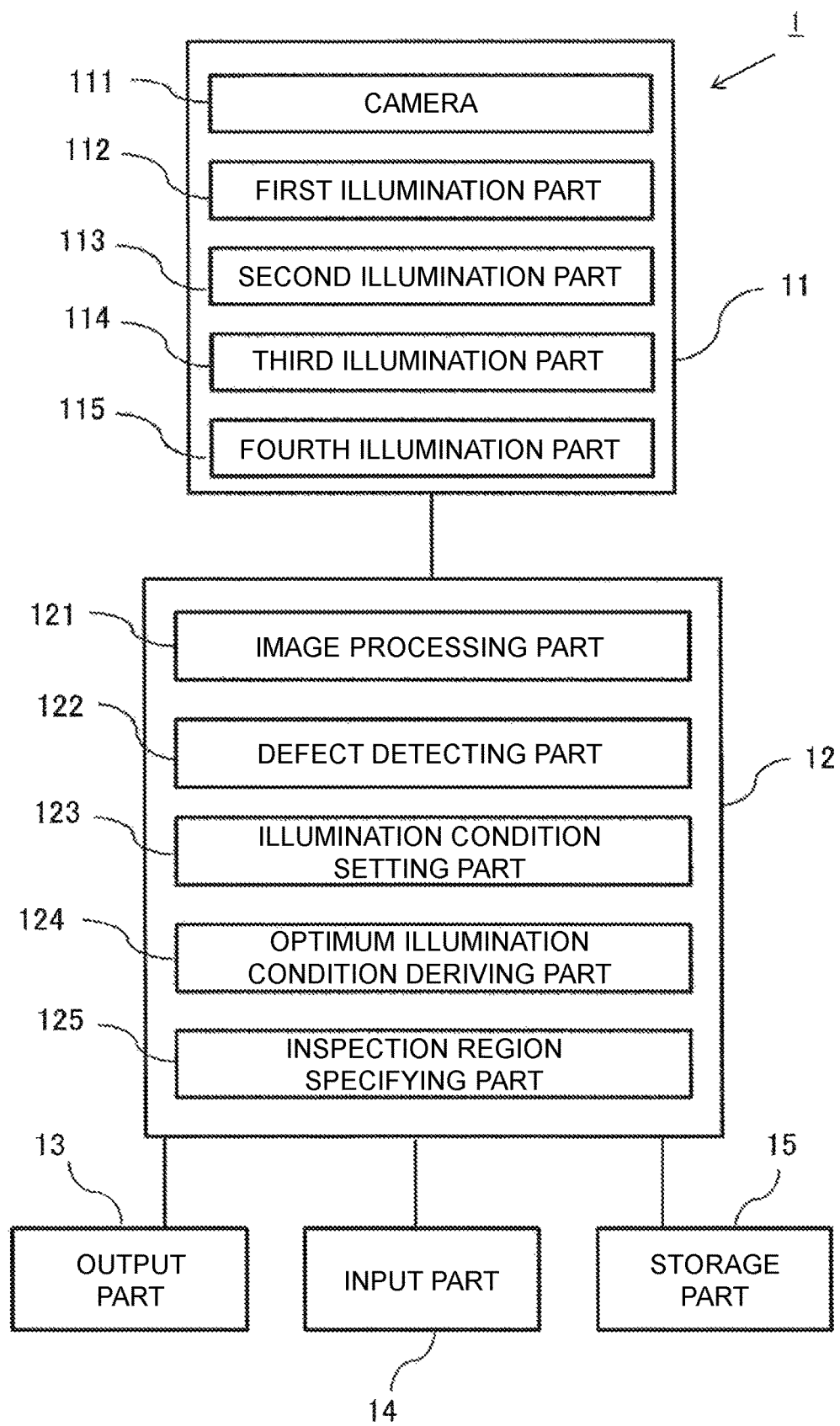
FIG. 7 is a block diagram showing an outline of a visual inspection device of variation 2.

In addition, the visual inspection device 1 may set only a specified region in the work piece instead of the entire work piece as the inspection target and derive the illumination condition optimized for the region. FIG. 7 is a block diagram showing an outline of the visual inspection device 1 of this variation. As shown in FIG. 7, compared with implementation example 1, the visual inspection device 1 of the variation is characterized in that an inspection region specifying part 125 is further provided as a function module of the control part 12.

The inspection region specifying part 125 specifies a fixed region (also referred to as an inspection target region hereinafter) on the inspection surface of the work piece as the inspection target. The inspection target region is specifically determined corresponding to the work piece by an inspection specification for example and the like, and the information is registered and held in the storage part 15 in advance via the input part 14. Additionally, the information of the inspection target region may also be inputted by the operator each time. The specification of the region may be in any range, for example, only a specified component on the substrate may be set as the inspection target region, or only a metal portion of a fixed range may be set as the inspection target region.

The inspection region specifying part 125 specifies, by acquiring information of the inspection target region corresponding to the work piece which is presently the inspection target, the inspection target region of the work piece. Accordingly, when the inspection target region is specified, the defect detection part 122 uses only the inspection target region as the target to perform the defect detection. Then, the optimum illumination condition deriving part 124 uses only the inspection target region as the target to perform the scoring of the image data and derive the optimum illumination condition.

According to such a configuration, compared with using the entire work piece as the target, the processing (operation) necessary for scoring can be reduced and the optimum illumination condition can be set more efficiently.

Additional Description

The description of the above implementation example merely describes the disclosure in an illustrative way, and the disclosure is not limited to the above specific embodiments. In the disclosure, various modifications are possible within the scope of the technical idea. For example, in the above implementation example, the elements determining the illumination condition are but not limited to the direction, color, illumination intensity of the illumination light; only a part of these elements may be set as the target, or other elements such as a shutter speed of the camera may be further included.

In addition, the calculation method of the score is not limited to the above examples, for example, the illumination condition, in which a difference of the luminance values between a non-defective part and a defective part of the image obtained by imaging the work piece is the largest, may be the best score.

One aspect of the disclosure is a visual inspection device 1 which includes an illumination part 112, 113, 114, 115 irradiating illumination lights to an inspection object; an imaging part 111 capturing an image of the inspection object; a defect detecting part 122 analyzing the image of the inspection object captured by the imaging part and detecting a defect of the inspection object; an illumination condition setting part 123 setting an illumination condition of the illumination light irradiated to the inspection object; and an optimum illumination condition deriving part 124 deriving an optimum illumination condition by scoring each of the illumination conditions based on images captured under a plurality of different illumination conditions, in which the optimum illumination condition is the most suitable illumination condition for detecting the defect of the inspection object by the defect detecting part.

<Other Configurations>

Other configurations of the disclosure are described below. A visual inspection device of the disclosure includes an illumination part irradiating illumination lights to an inspection object; an imaging part, capturing an image of the inspection object; a defect detecting part analyzing the image of the inspection object captured by the imaging part and detecting a defect of the inspection object; an illumination condition setting part setting an illumination condition of the illumination lights irradiated to the inspection object; and an optimum illumination condition deriving part, deriving an optimum illumination condition by performing a scoring on (or scoring) each of the illumination conditions based on the images captured under different illumination conditions, wherein the optimum illumination condition is a most suitable illumination condition for detecting the defect of the inspection object by the defect detecting part.

Here, "scoring each illumination condition" means that the appropriateness of the illumination condition is calculated as a numerical value. By having such a configuration, even for an operator not having sufficient optical knowledge or experience, the visual inspection of the inspection target can be implemented in an appropriate illumination condition. Further, the illumination condition herein refers to, for example, a condition defined by illumination elements such as the color (wavelength) of illumination light and the intensity (luminance) of illumination light and a combination of values of these elements.

In addition, the visual inspection device may be characterized in that at least any one of a direction, an intensity, a color of the illumination lights irradiated to the inspection object is included as an element for defining the illumination condition. It is common to determine what kind of defect of the inspection target is to be detected by these elements and the combination thereof, and it may be that these elements and the combination thereof are included as the elements defining the illumination conditions.

In addition, the optimum illumination condition deriving part may derive the optimum illumination condition by performing a first search and a second search. The first search selects a plurality of first search illumination conditions in which a value of a prescribed element is fixed from all the combinations of the elements defining the illumination conditions and performs the scoring to acquire a temporal optimum illumination condition with a best score from the plurality of first search illumination conditions; the second search estimates a range in which the optimum illumination condition actually exists based on the temporal optimum illumination condition obtained in the first search, and further performs the scoring under the illumination condition that the fixed value of the prescribed element is released in the range to acquire an actual optimum illumination condition. In addition, the second search may be performed using a binary search method.

When the elements defining the illumination conditions cover a plurality of items, since the combination number of these values becomes enormous, it takes a lot of time to capture images of the work piece in all the combinations, and the optimum illumination condition cannot be determined at a realistic time. At this point, according to the above method, an illumination condition for actually capturing the image of the work piece can be narrowed down and the setting of the optimum illumination condition can be efficiently performed.

In addition, in a case of two or more inspection objects, the optimum illumination condition deriving part may level differences of the optimum illumination conditions of the respective inspection objects caused by differences of the respective inspection objects, and derive a levelled optimum illumination condition suitable for inspections of the two or more inspection objects.

For example, strictly speaking, there may be differences in characteristics (shape and quality) in each product even for the same lot of products, so that the optimum illumination conditions for these inspections may also be different depending on the differences. In this case, when trying to set the optimum illumination condition corresponding to each product, the illumination condition might be set every time for each product.

Regarding this point, in the above-described visual inspection device, the above problems can be solved by setting the illumination condition leveled in a prescribed deviation range (acceptable in the inspection) as the optimum illumination condition.

In addition, the illumination part may include a coaxial episcopic illumination part, irradiating a first illumination light to the inspection object along an axis that is the same as an optical axis of the imaging part; and a peripheral direction illumination part, irradiating a second illumination light to the inspection object from a concentric peripheral direction centered on the axis.

By such a configuration, compared with a case that the illumination is only irradiated from surrounding of the work piece, an image can be obtained in which an influence of a diffuse reflection caused by a shape of the work piece surface is suppressed. On the other hand, the setting of the optimum illumination condition becomes complicate and thus the configuration is suitable for an application of the disclosure.

In addition, the visual inspection device may further include an inspection region specifying part that specifies a region of the inspection object where a defect detection is performed by the defect detecting part. If the location to be inspected is determined instead of using the entire inspection object as the inspection target, by using only the location as the inspection target, candidates for the optimum illumination condition can be narrowed down. That is, it is sufficient that only the illumination condition in which a defect can be appropriately detected in the specified region is set as the candidate, and the optimum illumination condition can be set more efficiently compared with using the entire inspection object as the target.

In addition, the illumination condition setting part may automatically set the illumination condition in accordance with the optimum illumination condition derived by the optimum illumination condition deriving part. By such a configuration, setting work of the illumination condition can be efficient.

In addition, the visual inspection device may use an object having a surface on which the illumination light is not uniformly reflected and gloss unevenness occurs as the inspection object. When the inspection objects are, for example, an object having a metal portion on the surface such as a flexible printed circuit board and a hard board, a sheet-like object which is uneven on the surface such as a Japanese paper and a non-woven fabric, and an object on which a pattern is drawn, and reflectance of an inspection surface of the inspection object is not uniform, the gloss unevenness is generated and a defect to be detected is mixed in the gloss unevenness in the captured image. That is, in regard to the object having a surface on which the gloss unevenness is generated, it is hard to set a threshold value for detecting an abnormality, but such gloss unevenness can be effectively suppressed by optimizing the illumination condition and thus the above object is suitable for the application of the disclosure.

In addition, in order to solve the above problems, a method is provided for setting an illumination condition of the visual inspection device that detects a defect in an inspection object based on an image obtained by irradiating illumination lights to the inspection object to image the inspection object. The method includes a first step for selecting a plurality of illumination conditions for search in which a value of a prescribed element is fixed from all the combinations of elements defining the illumination conditions; a second step for capturing images under the illumination conditions for search set by the first step; a third step for performing a scoring one each of the illumination conditions for search based on the images obtained in the second step; a fourth step for performing a comparison of the illumination conditions for search scored in the third step and acquiring a temporal optimum illumination condition; a fifth step for estimating a range in which the optimum illumination condition actually exists based on the assumed optimum illumination condition acquired in the fourth step, and further performing the scoring under the illumination condition that the fixed value of the prescribed element is released in the range to acquire an actual optimum illumination condition; and a sixth step for setting the actual optimum illumination condition acquired in the fifth step as the illumination condition of a visual inspection.

In addition, the disclosure can be also specified as a visual inspection system including at least a part of the above parts. In addition, the disclosure can also be specified as a method performed by the visual inspection device. The above processing or parts can be freely combined and implemented as long as technical contradictions are not generated.

According to the disclosure, a technology can be provided by which an optimum illumination condition can be set in a visual inspection device even without sufficient optical knowledge or experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A visual inspection device, comprising:
   illumination part, irradiating illumination lights to an inspection object;
   an imaging part, capturing an image of the inspection object;
   a defect detecting part, analyzing the image of the inspection object captured by the imaging part and detecting a defect of the inspection object;
   an illumination condition setting part, setting an illumination condition of the illumination lights irradiated to the inspection object; and
   an optimum illumination condition deriving part, deriving an optimum illumination condition by performing a scoring on each of the illumination conditions based on the images captured under the illumination conditions that are different, wherein the optimum illumination condition is the most suitable illumination condition for detecting the defect of the inspection object by the defect detecting part,
   wherein the optimum illumination condition deriving part derives the optimum illumination condition by performing a first search and a second search, and
   the first search selects a plurality of first search illumination conditions in which a value of a prescribed element is fixed from all combinations of elements defining the illumination conditions to perform the scoring and acquire a temporal optimum illumination condition with a best score from the plurality of first search illumination conditions; and
   the second search estimates a range in which the optimum illumination condition actually exists based on the temporal optimum illumination condition obtained in the first search, and further performs the scoring under the illumination condition that the value of the prescribed element which is fixed is released in the range to acquire the actual optimum illumination condition.

2. The visual inspection device according to claim 1, wherein at least any one of a direction, an intensity, and a color of the illumination lights irradiated to the inspection object is included as an element for defining the illumination condition.

3. The visual inspection device according to claim 2, wherein the optimum illumination condition deriving part derives the optimum illumination condition by performing a first search and a second search, and the first search selects a plurality of first search illumination conditions in which a value of a prescribed element is fixed from all combinations of the elements defining the illumination conditions to perform the scoring and acquire a temporal optimum illumination condition with a best score from the plurality of first search illumination conditions; and the second search estimates a range in which the optimum illumination condition actually exists based on the temporal optimum illumination condition obtained in the first search, and further performs the scoring under the illumination condition that the value of the prescribed element which is fixed is released in the range to acquire the actual optimum illumination condition.

4. The visual inspection device according to claim 1, wherein the second search is performed using a binary search method.

5. The visual inspection device according to claim 3, wherein the second search is performed using a binary search method.

6. The visual inspection device according to claim 1, wherein in a case of two or more inspection objects, the optimum illumination condition deriving part levels differences of the optimum illumination conditions of the respective inspection objects caused by differences of the respective inspection objects, and derives a leveled optimum illumination condition suitable for inspections of the two or more inspection objects.

7. The visual inspection device according to claim 2, wherein in a case of two or more inspection objects, the optimum illumination condition deriving part levels differences of the optimum illumination conditions of the respective inspection objects caused by differences of the respective inspection objects, and derives a leveled optimum illumination condition suitable for inspections of the two or more inspection objects.

8. The visual inspection device according to claim 1, wherein in a case of two or more inspection objects, the optimum illumination condition deriving part levels differences of the optimum illumination conditions of the respective inspection objects caused by differences of the respective inspection objects, and derives a leveled optimum illumination condition suitable for inspections of the two or more inspection objects.

9. The visual inspection device according to claim 1, wherein the illumination part comprises a coaxial episcopic illumination part, irradiating a first illumination light to the inspection object along an axis that is the same as an optical axis of the imaging part; and a peripheral direction illumination part, irradiating a second illumination light to the inspection object from a concentric peripheral direction centered on the axis.

10. The visual inspection device according to claim 2, wherein the illumination part comprises a coaxial episcopic illumination part, irradiating a first illumination light to the inspection object along an axis that is the same as an optical axis of the imaging part; and a peripheral direction illumination part, irradiating a second illumination light to the inspection object from a concentric peripheral direction centered on the axis.

11. The visual inspection device according to claim 1, wherein the illumination part comprises a coaxial episcopic illumination part, irradiating a first illumination light to the inspection object along an axis that is the same as an optical axis of the imaging part; and a peripheral direction illumination part, irradiating a second illumination light to the inspection object from a concentric peripheral direction centered on the axis.

12. The visual inspection device according to claim 1, further comprising an inspection region specifying part, specifying a region of the inspection object in which a defect detection is performed by the defect detecting part.

13. The visual inspection device according to claim 2, further comprising an inspection region specifying part, specifying a region of the inspection object in which a defect detection is performed by the defect detecting part.

14. The visual inspection device according to claim 1, further comprising an inspection region specifying part, specifying a region of the inspection object in which a defect detection is performed by the defect detecting part.

15. The visual inspection device according to claim 1, wherein the illumination condition setting part automatically sets the illumination condition in accordance with the optimum illumination condition derived by the optimum illumination condition deriving part.

16. The visual inspection device according to claim 2, wherein the illumination condition setting part automatically sets the illumination condition in accordance with the optimum illumination condition derived by the optimum illumination condition deriving part.

17. The visual inspection device according to claim 1, wherein an object having a surface on which the illumination light is not uniformly reflected and gloss unevenness occurs is used as the inspection object.

18. The visual inspection device according to claim 2, wherein an object having a surface on which the illumination light is not uniformly reflected and gloss unevenness occurs is used as the inspection object.

19. A method for setting illumination condition of a visual inspection device, including an illumination part, an imaging part, a defect detecting part, an illumination condition setting part, and an optimum illumination condition deriving part, the method comprising:

irradiating, by the illumination part, illumination lights to an inspection object;

analyzing, by the defect detecting part, the image of the inspection object captured by the imaging part and detecting a defect of the inspection object;

setting, by the illumination condition setting part, an illumination condition of the illumination lights irradiated to the inspection object; and deriving, by the optimum illumination condition deriving part, an optimum illumination condition by performing a scoring on each of the illumination conditions based on the images captured under the illumination conditions that are different, wherein the optimum illumination condition is the most suitable illumination condition for detecting the defect of the inspection object by the defect detecting part, wherein the optimum illumination condition is derived by performing a first search and a second search, wherein the first search selects a plurality of first search illumination conditions in which a value of a prescribed element is fixed from all combinations of elements defining the illumination conditions to perform the scoring and acquire a temporal optimum illumination condition with a best score from the plurality of first search illumination conditions; and wherein the second search estimates a range in which the optimum illumination condition actually exists based on the temporal optimum illumination condition obtained in the first search, and further performs the scoring under the illumination condition that the value of the prescribed element which is fixed is released in the range to acquire the actual optimum illumination condition.

* * * * *